(12) United States Patent
Lahartinger

(10) Patent No.: US 8,903,908 B2
(45) Date of Patent: Dec. 2, 2014

(54) COLLABORATIVE MEDIA SHARING

(75) Inventor: Bryan Jacob Lahartinger, Kitchener (CA)

(73) Assignee: BlackBerry Limited, Waterloo Ontario (CA)

( * ) Notice: Subject to any disclaimer, the term of this patent is extended or adjusted under 35 U.S.C. 154(b) by 168 days.

(21) Appl. No.: 13/177,863

(22) Filed: Jul. 7, 2011

(65) Prior Publication Data

US 2013/0013679 A1 Jan. 10, 2013

(51) Int. Cl.
| | | |
|---|---|---|
| G06F 15/16 | (2006.01) | |
| G06F 15/173 | (2006.01) | |
| H04N 5/93 | (2006.01) | |
| H04N 21/4788 | (2011.01) | |
| H04N 21/414 | (2011.01) | |
| G11B 27/031 | (2006.01) | |

(52) U.S. Cl.
CPC ..... *H04N 21/4788* (2013.01); *H04N 21/41415* (2013.01); *G09G 2370/20* (2013.01); *G11B 27/031* (2013.01)
USPC ............................. 709/204; 709/241; 386/280

(58) Field of Classification Search
USPC .......................................................... 709/204
See application file for complete search history.

(56) References Cited

U.S. PATENT DOCUMENTS

| | | | | |
|---|---|---|---|---|
| 5,689,641 | A * | 11/1997 | Ludwig et al. ................ | 709/241 |
| 6,601,093 | B1 * | 7/2003 | Peters .......................... | 709/220 |
| 7,174,385 | B2 | 2/2007 | Li | |
| 7,458,013 | B2 | 11/2008 | Fruchter et al. | |
| 7,539,767 | B2 | 5/2009 | Li | |
| 7,664,109 | B2 | 2/2010 | Li | |
| 7,743,135 | B2 * | 6/2010 | Azuma ........................ | 709/224 |
| 7,752,327 | B2 | 7/2010 | Li | |
| 7,933,956 | B2 | 4/2011 | Hon et al. | |
| 8,249,423 | B2 * | 8/2012 | Ekstrand ...................... | 386/249 |
| 2004/0083306 | A1 * | 4/2004 | Gloe ............................ | 709/245 |
| 2006/0235997 | A1 * | 10/2006 | Munirajan et al. ............ | 709/245 |
| 2006/0245403 | A1 * | 11/2006 | Kumar .......................... | 370/338 |
| 2007/0127471 | A1 * | 6/2007 | Cantenot ...................... | 370/390 |
| 2008/0008179 | A1 * | 1/2008 | Chen et al. ................... | 370/392 |
| 2008/0013916 | A1 | 1/2008 | Sharpe | |
| 2008/0205385 | A1 * | 8/2008 | Zeng et al. ................... | 370/389 |
| 2009/0196570 | A1 * | 8/2009 | Dudas et al. .................. | 386/52 |
| 2009/0282454 | A1 * | 11/2009 | Ekstrand ...................... | 725/134 |
| 2010/0192107 | A1 * | 7/2010 | Takahashi ..................... | 715/856 |

(Continued)

OTHER PUBLICATIONS

Extended EP Search Report for EP Application No. 11173090.9-1241 dated Dec. 29, 2011.

(Continued)

*Primary Examiner* — Brian P Whipple
*Assistant Examiner* — James Edwards
(74) *Attorney, Agent, or Firm* — Jon A. Gibbons; Fleit Gibbons Gutman Bongini & Bianco PL

(57) ABSTRACT

Devices and methods are provided for the collaborative management of digital media. A plurality of users respectively use their mobile devices to provide a corresponding plurality of digital media data to a media server node, which then displays it within a display. Instructions in the form of control data are then received from the mobile devices, which are then used to perform collaborative management of the displayed digital media data. Various collaborative sequencing and editing operations are performed by the users to create a composite digital media file, which is then transferred to one or more of the user's mobile devices.

11 Claims, 6 Drawing Sheets

(56) References Cited

U.S. PATENT DOCUMENTS

| | | | |
|---|---|---|---|
| 2010/0235614 A1* | 9/2010 | Callaghan et al. | 713/1 |
| 2010/0260468 A1 | 10/2010 | Khatib et al. | |
| 2010/0292818 A1* | 11/2010 | Ramsay | 700/94 |
| 2011/0026898 A1 | 2/2011 | Lussier et al. | |
| 2011/0252093 A1* | 10/2011 | Spataro et al. | 709/204 |
| 2012/0046770 A1* | 2/2012 | Becker et al. | 700/94 |
| 2012/0096138 A1* | 4/2012 | Lambert et al. | 709/223 |
| 2012/0096184 A1* | 4/2012 | Lambert et al. | 709/245 |
| 2012/0158577 A1* | 6/2012 | Tam et al. | 705/38 |
| 2013/0343722 A1* | 12/2013 | Lahr et al. | 386/241 |

OTHER PUBLICATIONS

Canadian Examination Report dated Jan. 3, 2014 for Canadian Application No. 2782780.

* cited by examiner

COLLABORATIVE MEDIA SHARING

BACKGROUND OF THE INVENTION

1. Field of the Invention

The present invention is directed in general to communications systems and methods for operating same. In one aspect, the present invention relates to devices and methods for the collaborative management of digital media.

2. Description of the Related Art

The use of mobile devices, such as cellular phones, has become increasingly popular in recent years for voice communications. More recently, "smart phones" and other wirelessly-enabled mobile devices have been introduced that have extended digital media capabilities. These capabilities include storing and playing large volumes of audio content, capturing still photographs, and recording video images with accompanying audio soundtracks. Furthermore, such digital media content can easily be forwarded to others as a result of the inherent communications capabilities of these devices.

Another known aspect of such mobile devices is their use for collaboration. One example is merging images taken by multiple, spatially distributed mobile devices to produce a single large image. Another example is using multiple mobile devices to collaboratively edit a document. Yet another example is collaborative, on-line game playing between multiple players.

There are also known approaches for transmitting digital media data stored on a mobile device to a television or computer monitor for display. However, there is currently no known approach for collaboratively managing, editing and sequencing such media within a display. Furthermore, there is no known approach for combining such media into an aggregate compilation and then sharing it with contributors and others.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
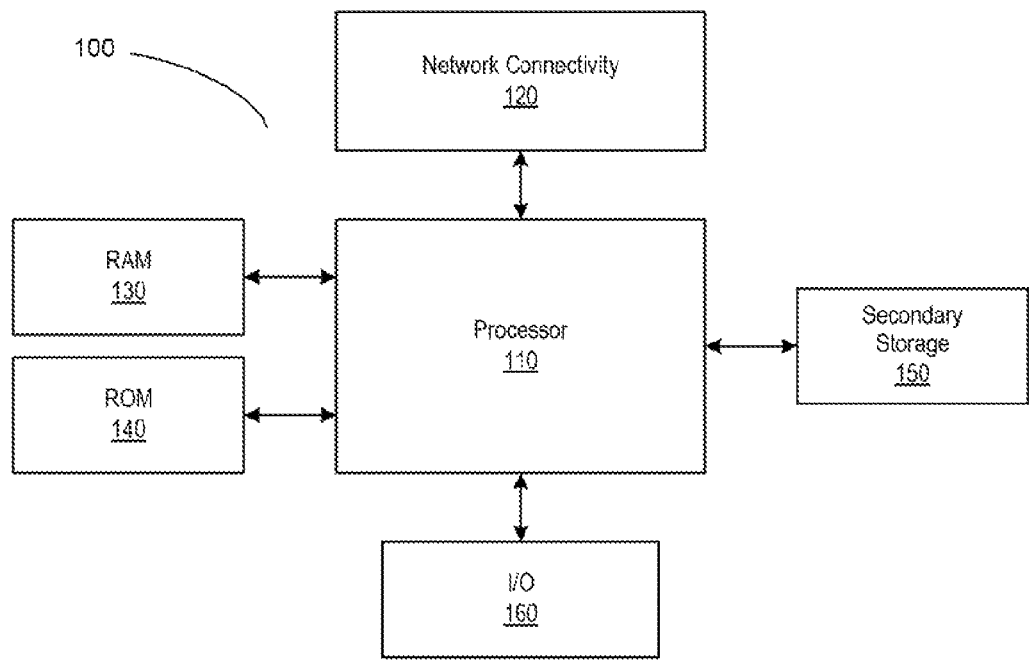
FIG. 1 depicts an exemplary system in which the present invention may be implemented.

Devices and methods are provided for the collaborative management of digital media. In various embodiments, a media server node receives a plurality of digital media data that is wirelessly provided from a respective plurality of mobile devices. In these and other embodiments, the media server node processes the received digital media data to associate metadata respectively corresponding to the mobile devices that provided it and their associated users. The digital media data, and its corresponding metadata, is then displayed within a user interface (UI) window of a display, such as a television set or computer monitor.

Instructions in the form of control data are then received from the mobile devices, which is then used by the media server node to perform collaborative management of the displayed digital media data. In certain embodiments, the control data is generated as a result of the users using their mobile devices to wirelessly select control icons displayed within the UI window of the display. In various embodiments, the digital media data is displayed within a sub-window of the UI of the display that corresponds to each user. Each user then uses their mobile device to transfer predetermined digital media data from their respective sub-window into a composite sub-window. Various collaborative sequencing and editing operations are then performed by the users to create a composite digital media file, which is then then transferred to one or more of the user's mobile devices.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
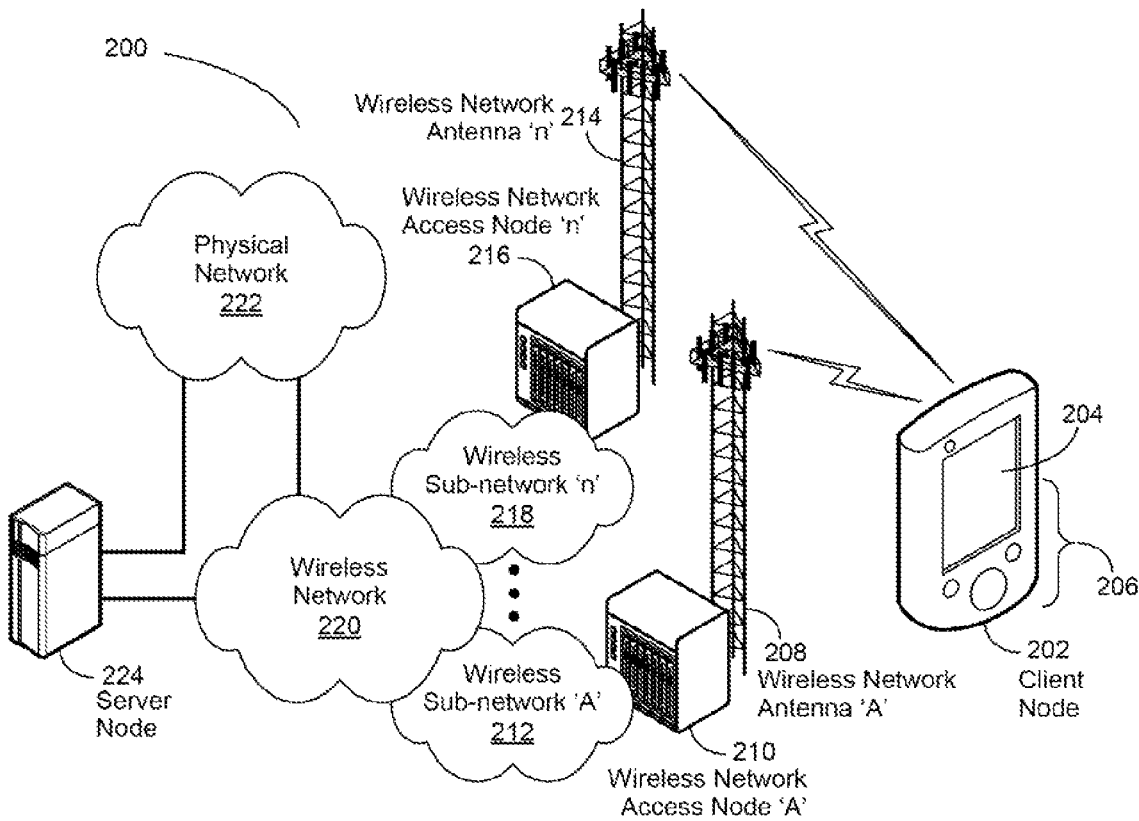
FIG. 2 shows a wireless-enabled communications environment including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
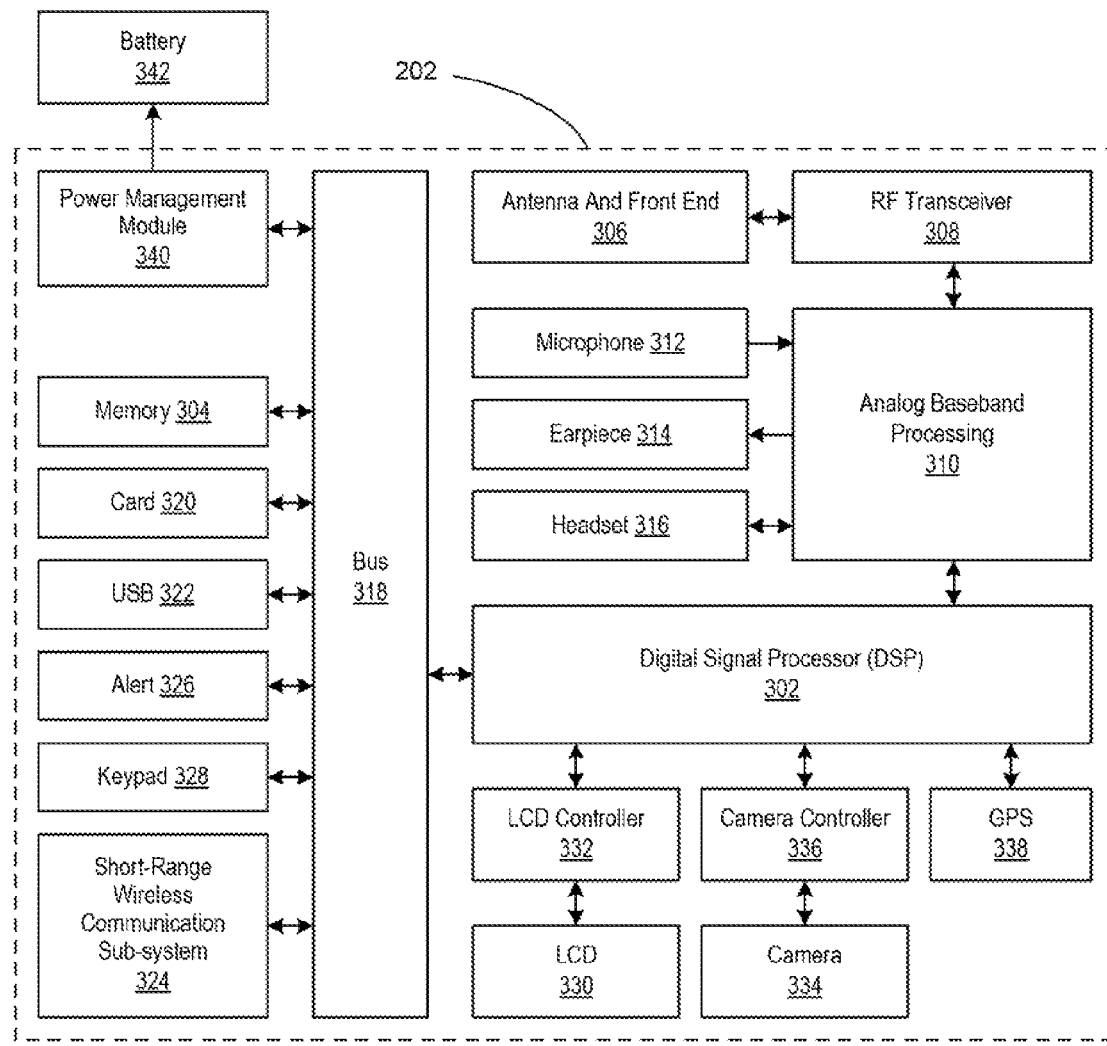
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration.

The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
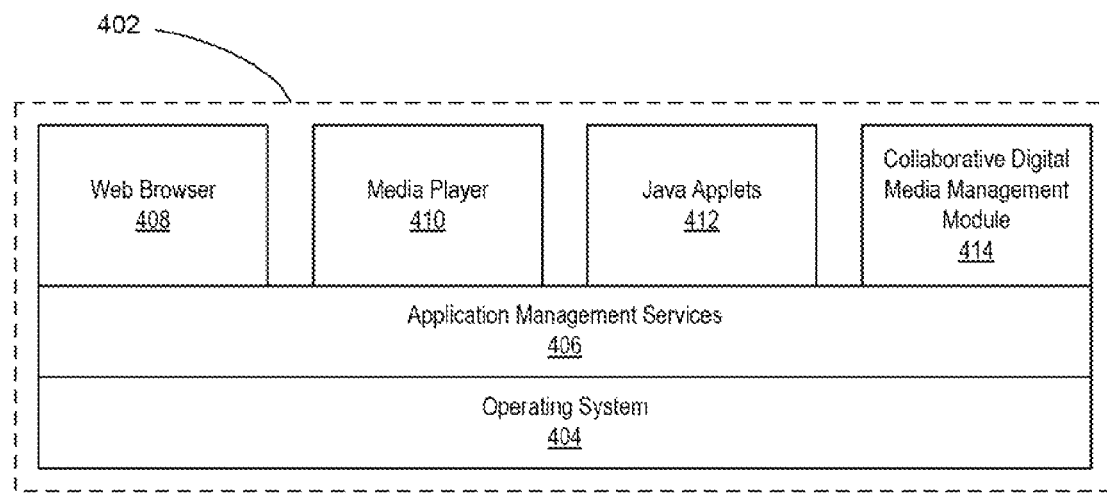
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A collaborative digital media management module 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
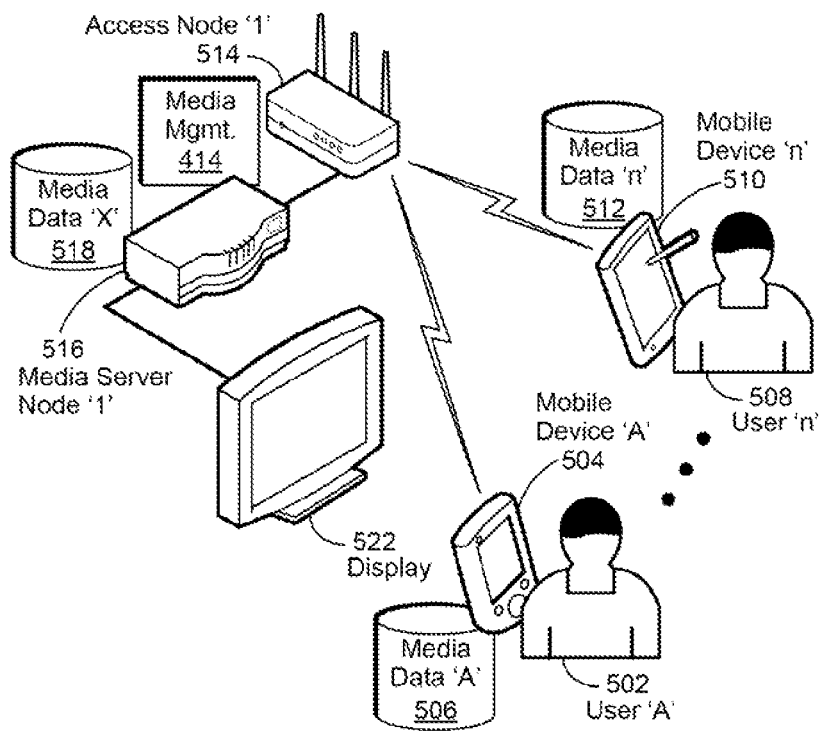
FIG. 5 is a simplified block diagram of the use of a local media server node to perform collaborative digital media data management operations in a local wireless communications environment.

FIG. 5 is a simplified block diagram of the use of a local media server node as implemented in accordance with an embodiment of the invention to perform collaborative digital media data management operations in a local wireless communications environment. In this embodiment, a local media server node '1' 516 comprises a collaborative digital media management module 414 and a repository of digital media data 'X' 518. In this and other embodiments, users 'A' 502 through 'n' 502 respectively use mobile devices 'A' 504 through 'n' 510 to establish a wireless communications session with a local access node '1' 514, such as that using WiFi communications protocols based on the IEEE 802.11x standard. Once the communication session is established, predetermined digital media data 'A' 506 through 'n' 512 is respectively transferred from the mobile devices 'A' 504 through 'n' 510 to the local media server node '1' 516, where it is stored in the repository of media data 'X' 518. The local media server node '1' 516 then uses the collaborative digital media management module 414 to apply metadata to the predetermined digital media data 'A' 506 through 'n' 512 to respectively associate it with users 'A' 502 through 'n' 502 and their mobile devices 'A' 504 through 'n' 510.

Operations are then performed by the local media server node '1' 516 to display the digital media data, and its associated metadata, within a user interface (UI) window of display 522. In this and various other embodiments, instructions to collaboratively manage the displayed digital media data, in the form of control data, is received by the local media server node '1' 516 from the mobile devices 'A' 504 through 'n' 510 associated with users A' 502 through 'n' 502. The media server node '1' 516 then uses the collaborative digital media management module 414 to process the received control data to perform the aforementioned collaborative management of the displayed digital media data. In certain embodiments, and as described in greater detail herein, the control data is generated as a result of users A' 502 through 'n' 502 using their mobile devices 'A' 504 through 'n' 510 to wirelessly select control icons displayed within the UI window of the display 522. In these and other embodiments, the control data comprises instructions to save individual digital media items as a composite digital media file.

Figure 6:
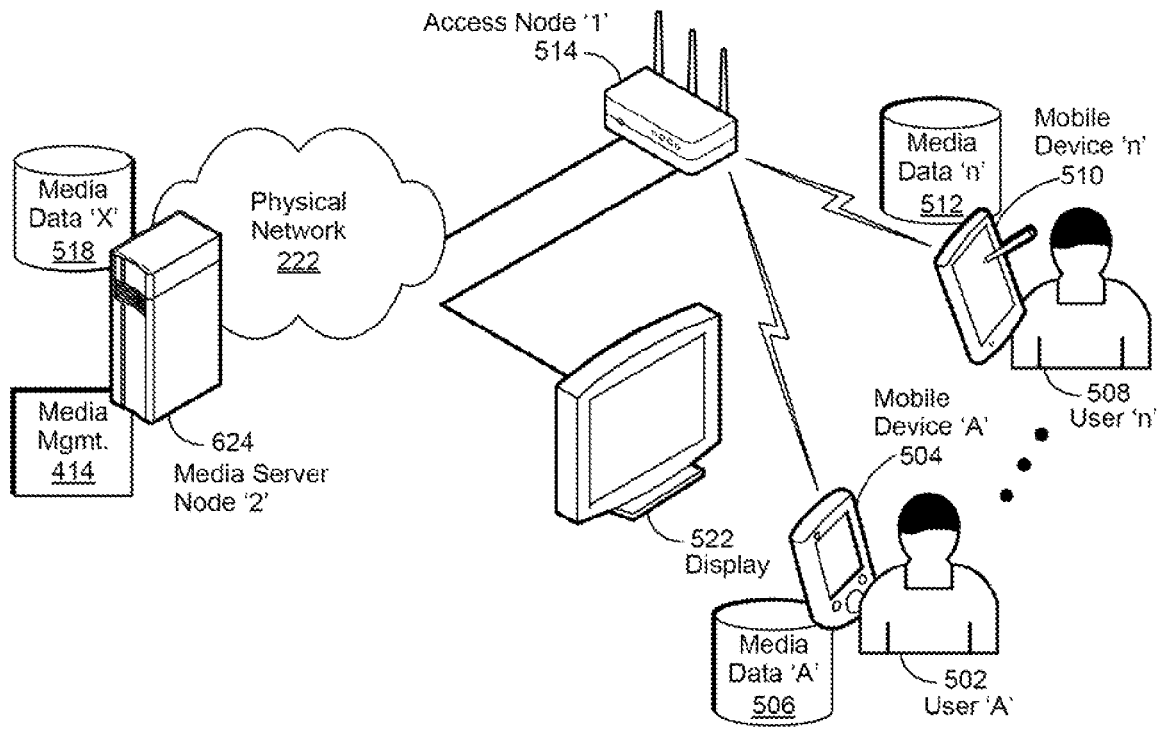
FIG. 6 is a simplified block diagram of the use of a remote media server node to perform collaborative digital media data management operations in a local wireless communications environment.

FIG. 6 is a simplified block diagram of the use of a remote media server node as implemented in accordance with an embodiment of the invention to perform collaborative digital media data management operations in a local wireless communications environment. In this embodiment, a remote media server node '2' 624 comprises a collaborative digital media management module 414 and a repository of digital media data 'X' 518. In this and other embodiments, users 'A' 502 through 'n' 502, respectively use mobile devices 'A' 504 through 'n' 510 to establish a wireless communications session with a local access node '1' 514, such as that using WiFi communications protocols based on the IEEE 802.11x standard. Once the communication session is established, predetermined digital media data 'A' 506 through 'n' 512 is respectively transferred from the mobile devices 'A' 504 through 'n' 510 to the remote media server node '2' 624 through a connection to physical network 222, where it is stored in the repository of media data 'X' 518. The remote media server node '2' 624 then uses the collaborative digital media management module 414 to apply metadata to the predetermined digital media data 'A' 506 through 'n' 512 to respectively associate it with users 'A' 502 through 'n' 502 and their mobile devices 'A' 504 through 'n' 510.

Operations are then performed by the remote media server node '2' 624 to display the digital media data, and its associated metadata, within a user interface (UI) window of display 522. In this and various other embodiments, instructions to collaboratively manage the displayed digital media data, in the form of control data, is received by the media server node '2' 516 from the mobile devices 'A' 504 through 'n' 510 associated with users A' 502 through 'n' 502. The remote media server node '2' 624 then uses the collaborative digital media management module 414 to process the received control data to perform the aforementioned collaborative management of the displayed digital media data. In certain embodiments, and as described in greater detail herein, the control data is generated as a result of users A' 502 through 'n' 502 using their mobile devices 'A' 504 through 'n' 510 to wirelessly select control icons displayed within the UI window of the display 522. In these and other embodiments, the control data comprises instructions to save individual digital media items as a composite digital media file.

Figure 7:
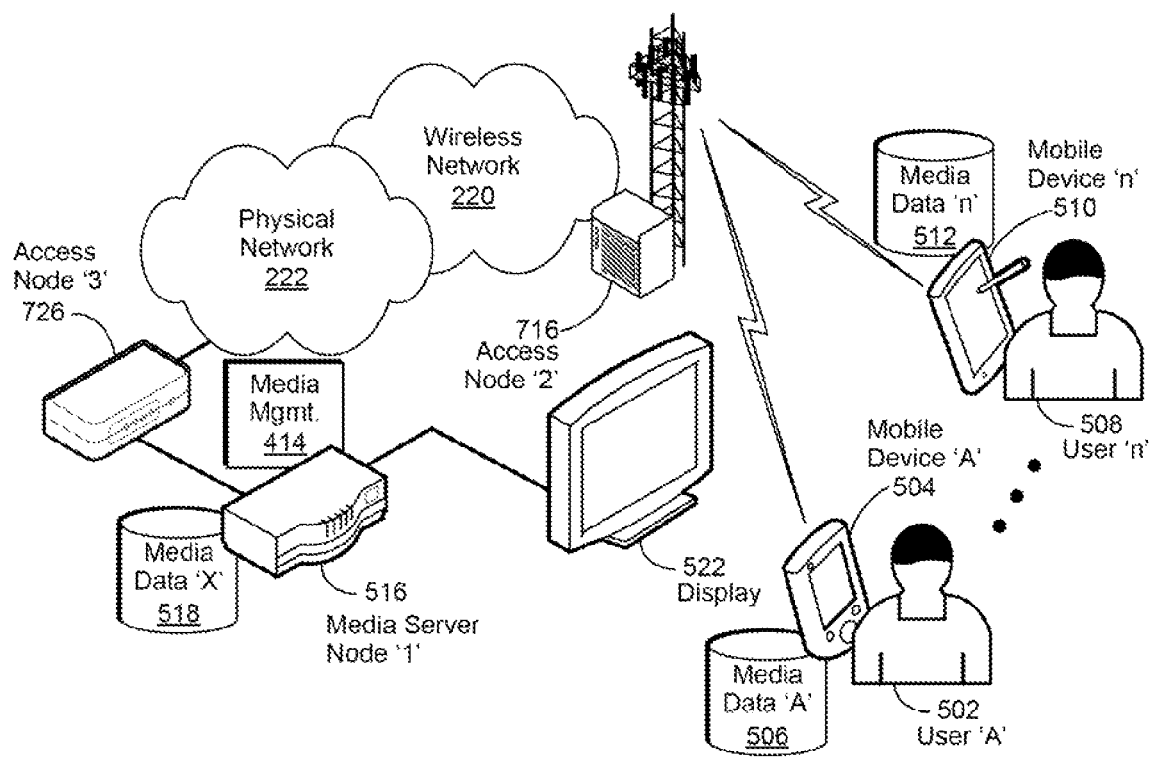
FIG. 7 is a simplified block diagram of the use of a local media server node to perform collaborative digital media data management operations in a distributed wireless communications environment.

FIG. 7 is a simplified block diagram of the use of a local media server node as implemented in accordance with an embodiment of the invention to perform collaborative digital media data management operations in a distributed wireless communications environment. In this embodiment, a local media server node '1' 516 comprises a collaborative digital media management module 414 and a repository of digital media data 'X' 518. In this and other embodiments, users 'A' 502 through 'n' 502, respectively use mobile devices 'A' 504 through 'n' 510 to establish a wireless communications session with a cellular access node '2' 716. Once the communication session is established, predetermined digital media data 'A' 506 through 'n' 512 is respectively transferred from the mobile devices 'A' 504 through 'n' 510 to the cellular access node '2' 716. From there, it is transferred over a connection to the wireless network 220, which is interconnected to the physical network 222, which in turn is connected to the local access node '3' 726, to the local media server node '1' 516, where it is stored in the repository of media data 'X' 518. The media server node '1' 516 then uses the collaborative digital media management module 414 to apply metadata to the predetermined digital media data 'A' 506 through 'n' 512 to respectively associate it with users 'A' 502 through 'n' 502 and their mobile devices 'A' 504 through 'n' 510.

Operations are then performed by the local media server node '1' 516 to display the digital media data, and its associated metadata, within a user interface (UI) window of display 522. In this and various other embodiments, instructions to collaboratively manage the displayed digital media data, in the form of control data, is received by the local media server node '1' 516 from the mobile devices 'A' 504 through 'n' 510 associated with users A' 502 through 'n' 502. The local media server node '1' 516 then uses the collaborative digital media management module 414 to process the received control data to perform the aforementioned collaborative management of the displayed digital media data. In certain embodiments, and as described in greater detail herein, the control data is generated as a result of users A' 502 through 'n' 502 using their mobile devices 'A' 504 through 'n' 510 to wirelessly select control icons displayed within the UI window of the display 522. In these and other embodiments, the control data comprises instructions to save individual digital media items as a composite digital media file.

Figure 8:
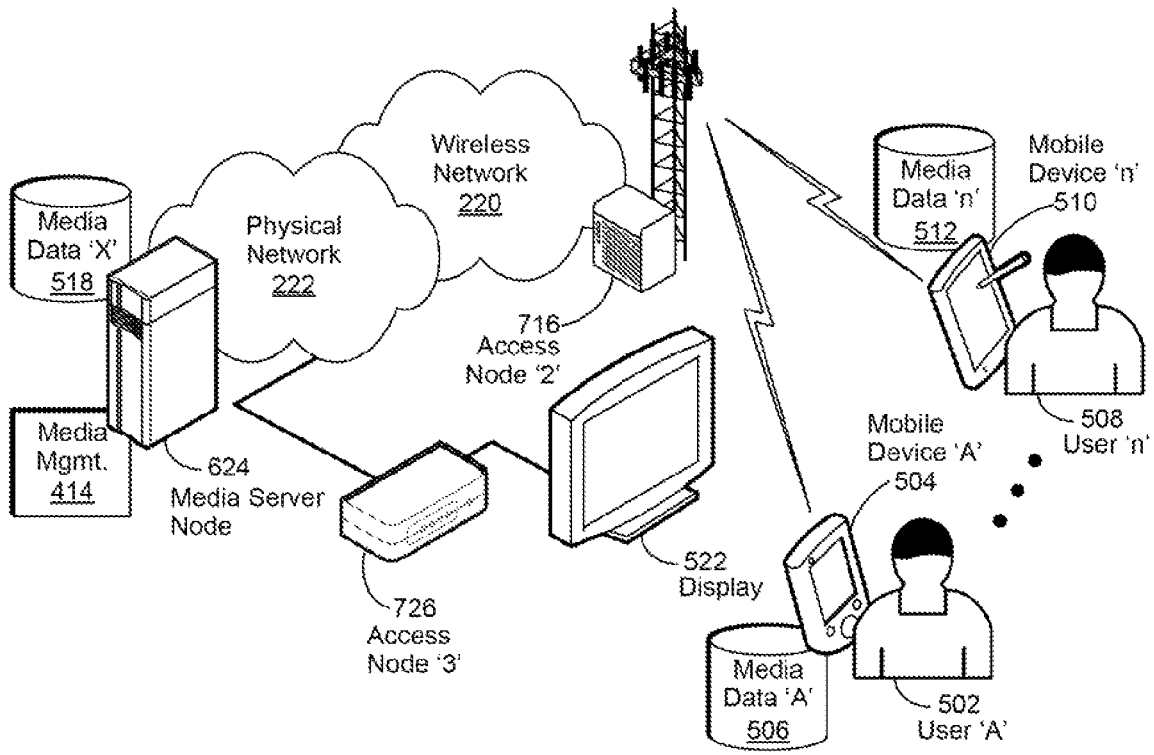
FIG. 8 is a simplified block diagram of the use of a remote media server node to perform collaborative digital media data management operations in a distributed wireless communications environment.

FIG. 8 is a simplified block diagram of the use of a remote media server node as implemented in accordance with an embodiment of the invention to perform collaborative digital media data management operations in a distributed wireless communications environment. In this embodiment, a remote media server node '2' 624 comprises a collaborative digital media management module 414 and a repository of digital media data 'X' 518. In this and other embodiments, users 'A' 502 through 'n' 502, respectively use mobile devices 'A' 504 through 'n' 510 to establish a wireless communications session with a cellular access node '2' 716. Once the communication session is established, predetermined digital media data 'A' 506 through 'n' 512 is respectively transferred from the mobile devices 'A' 504 through 'n' 510 to the cellular access node '2' 716. From there, it is transferred over a connection to the wireless network 220, which is interconnected to the physical network 222, which in turn is connected to the local access node '3' 726, to the media server node '1' 516, where it is stored in the repository of media data 'X' 518. The media server node '1' 516 then uses the collaborative digital media management module 414 to apply metadata to the predetermined digital media data 'A' 506 through 'n' 512 to respectively associate it with users 'A' 502 through 'n' 502 and their mobile devices 'A' 504 through 'n' 510.

Operations are then performed by the remote media server node '2' 624 to display the digital media data, and its associated metadata, within a user interface (UI) window of display 522. In this and various other embodiments, instructions to collaboratively manage the displayed digital media data, in the form of control data, is received by the media server node '2' 516 from the mobile devices 'A' 504 through 'n' 510 associated with users A' 502 through 'n' 502. The remote media server node '2' 624 then uses the collaborative digital media management module 414 to process the received control data to perform the aforementioned collaborative management of the displayed digital media data. In certain embodiments, and as described in greater detail herein, the control data is generated as a result of users A' 502 through 'n' 502 using their mobile devices 'A' 504 through 'n' 510 to wirelessly select control icons displayed within the UI window of the display 522. In these and other embodiments, the control data comprises instructions to save individual digital media items as a composite digital media file.

Figure 9:
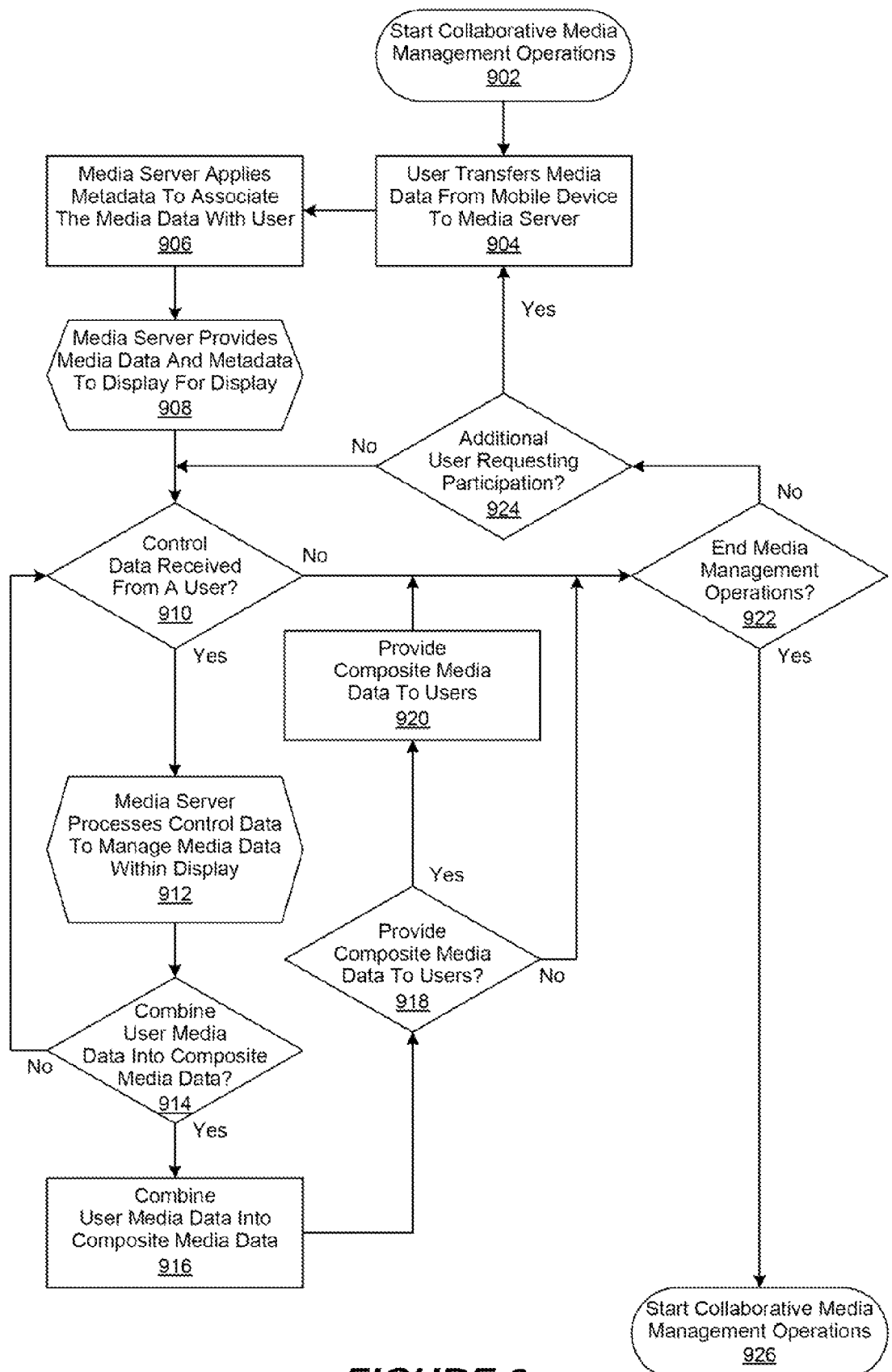
FIG. 9 is a flowchart of the performance of collaborative digital media data management operations.

FIG. 9 is a flowchart of the performance of collaborative digital media data management operations as implemented in accordance with an embodiment of the invention within a wireless communications environment. In this embodiment, collaborative digital media data management operations within a wireless communications environment are begun in step 902. Then, in step 904, a first user transfers digital media data from their mobile device to a media server node as described in greater detail herein. The media server node then applies metadata to the digital media in step 906 to associate it with the user and the user's mobile device. In step 908, ongoing operations are performed by the media server node to display the digital media data, and its associated metadata, within a display such as a television set or a computer monitor.

A determination is then made in step 910 whether control data to collaboratively manage the displayed digital media data has been received from a mobile device user. If so, then ongoing operations are performed by the media server node in step 912 to process the control data to collaboratively manage the digital media data and its associated metadata within the display. In various embodiments, the control data is generated by a user's mobile device in response to user input that comprises control instructions as described in greater detail herein. In these and other embodiments, the control instruction is provided to the media server node during a wireless communications session. In certain of these embodiments, the control data is generated as a result of a user using their mobile device to wirelessly select control icons displayed within the display.

Once the ongoing control data processing operations are completed in step 912, a determination is made in step 914 whether to combine digital media data associated with one or more users into a composite digital media data file. If not, then the process is continued, proceeding with step 910. Otherwise, digital media data associated with one or more users is aggregated in step 916 to create a composite digital media data file. Then, in step 918, a determination is made whether to provide the composite digital media data file to one or more users. If so, then it is provided to one or more mobile device users in step 920. Thereafter, or if it was determined in step 918 not to provide the composite digital media data file to one or more users, or if no control data was received from a mobile device user in step 910, then a determination is made in step 922 whether to continue collaborative digital media data management operations. If not, then collaborative digital media data management operations are ended in step 924. Otherwise, a determination is made in step 924 whether another mobile device user requests participation in collaborative digital media data management operations. If so, then the process is continued, proceeding with step 904. Otherwise, the process is continued, proceeding with step 910.

Figure 10:
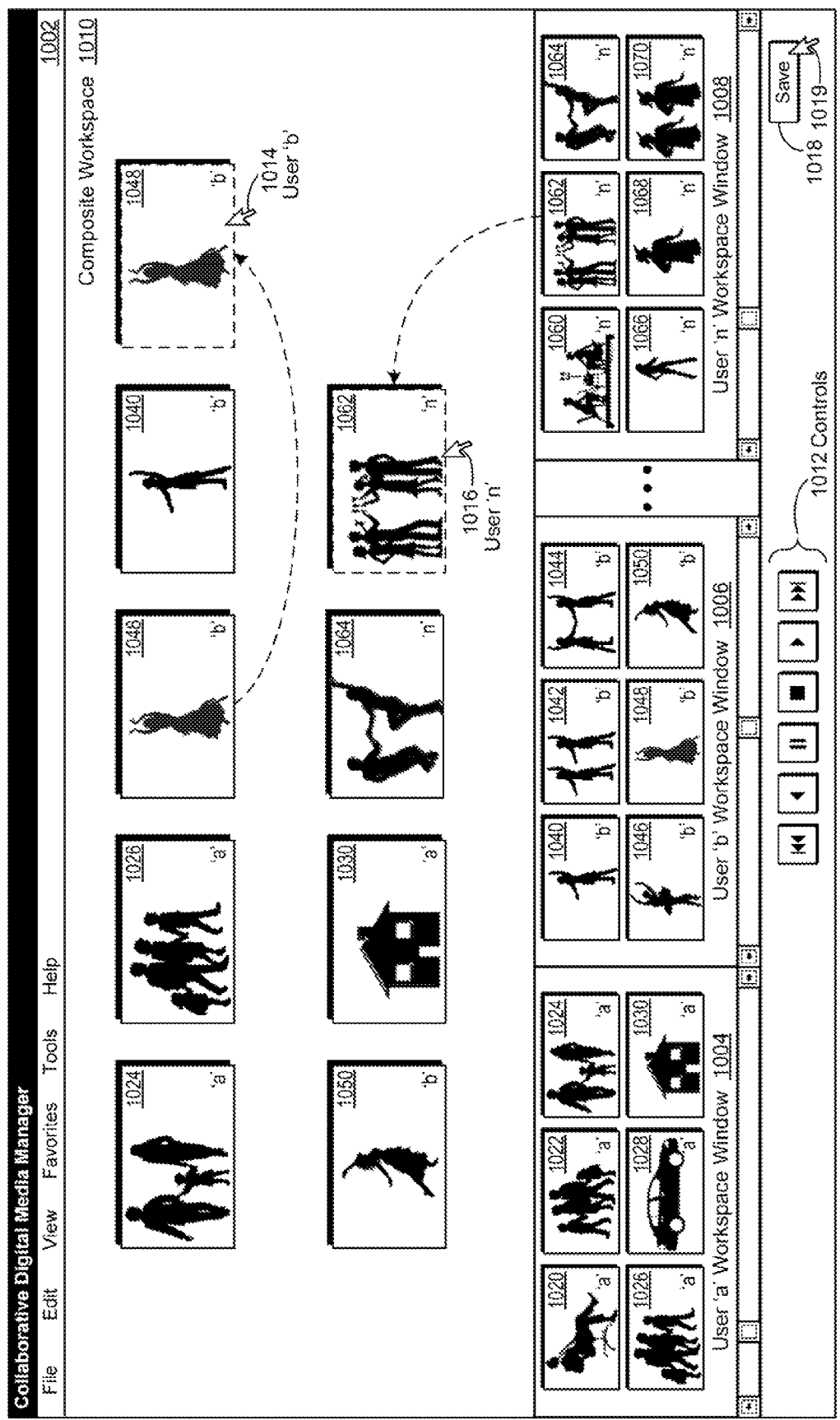
FIG. 10 shows the performance of collaborative digital media data management operations within a user interface (UI) window of a display.

FIG. 10 shows the performance of collaborative digital media data management operations as implemented in accordance with an embodiment of the invention within a user interface (UI) window of a display. In this embodiment, collaborative digital media data management operations, as described in greater detail herein, are performed within a UI window 1002 of a display. As shown in FIG. 10, the UI window 1002 comprises user workspace sub-windows 'a'

1004, 'b' 1006, through 'n' 1008, a composite workspace sub-window 1010, a set of on-screen digital media data management controls, and a 'Save' 1018 command button.

In this and other embodiments, users transfer digital media data from their mobile devices to a media server node. In turn, the digital media receives the digital media data and then processes it to apply metadata to associate it with each user and their respective mobile device. The processed digital media is then displayed by the media server node within the UI window 1002 of the display. In various embodiments, each user's digital media data is respectively displayed within a sub-window, or portion, of the UI window 1002, along with its associated metadata. As shown in FIG. 10, a plurality of digital media data 1020, 1022, 1024, 1026, 1028 and 1030 associated with user 'a' is displayed within user workspace sub-window 'a' 1004. As likewise shown in FIG. 10, a plurality of digital media data 1040, 1042, 1044, 1046, 1048, 1050, 1060, 1062, 1064, 1066, 1068 and 1070 associated with users 'b' through 'n' is respectively displayed within user workspace sub-windows 'a' 1004 through 'n' 1008.

As described in greater detail herein, instructions to collaboratively manage the displayed digital media data, in the form of control data, is wirelessly received from mobile devices associated with various users by the digital media server. In certain embodiments, the control data is generated as a result of a user using their mobile device to wirelessly select control icons 1012 displayed within the UI window 1002 of the display. As an example, user 'n' may select predetermined digital media data item 1062 through a user gesture familiar to those of skill in the art, such as a mouse click-and-drag with cursor 1016, to move it from the user workspace sub-window 'n' to the composite workspace sub-window 1010. Likewise, user 'b' may reorder digital media data item 1048 within the composite workspace sub-window 1010 through the use of a user gesture, such as a mouse click-and-drag with cursor 1014.

In various embodiments, the control data comprises instructions to save individual digital media items 1024, 1026, 1040, 1048, 1050, 1030, 1064, 1062 residing within the composite workspace sub-window 1010 as a composite digital media file. As an example, one or more users may use the cursor 1019 to select the 'Save' 1018 command button. Likewise, one or more user may select the on-screen control icons 1012 with their respective mobile device to sequence the resulting composite digital media file displayed within the UI window 1002. It will be appreciated by skilled practitioners of the art that many such control data operations are possible and the foregoing is not intended to limit the spirit and scope of the invention.

Although the described exemplary embodiments disclosed herein are described with reference to the use of mobile devices for the collaborative management of digital media, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A media node computer, comprising:
processing logic, the processing logic communicatively coupled to a display located in a single geographic location and configured to perform collaborative media data editing by at least a first user and a second user and to render a user interface (UI) window on the display with at least a first user workspace sub-window, a second user workspace sub-window, and a composite workspace sub-window, the sub-windows being rendered contemporaneously on the display, and to:
receive a first set of media data from a first electronic device and a second set of media data from a second electronic device;
render the first set of media data within the first user workspace sub-window and the second set of media data within the second user workspace sub-window;
receive a first set of control data from a first mobile computing device corresponding to a click-and-drag selection and move by the first user of at least part of the first media data within the first user workspace sub-window and movement of the selected first media data into the composite workspace sub-window;
receive a second set of control data from a second mobile computing device corresponding to a click-and-drag selection and move by the second user of at least part of the second media data within the second user workspace sub-window and movement of the selected second media data into the composite workspace sub-window; and
render, within the composite workspace sub-window, the first selected media data that has been moved, and the second selected media data that has been moved.

2. The node computer of claim 1, wherein at least one of the first set of control data from the first mobile device and second set of control data from the second device includes control data to control icons in the UI window.

3. The media node computer of claim 1,
wherein the first and second sets of media data are received over a wireless connection.

4. The media node computer of claim 1, wherein the first set of media is received from the first mobile device and the second set of media is received from the second mobile device.

5. A method for collaboratively managing digital media data by first and second mobile users, comprising:
via a server node comprising processing logic communicatively coupled to a display to present a user interface (UI) window with at least a first user workspace sub-window, a second user workspace sub-window, and a composite workspace sub-window, the sub-windows being rendered contemporaneously on the display:
receiving a first set of media data from a first mobile computing electronic device and a second set of media data from a second mobile computing electronic device;
rendering the first set of media data in the first user workspace sub-window and the second set of media data within the second user workspace sub-window;
receiving a first set of control data from a first mobile device corresponding to a click-and-drag selection and move by the first user of at least part of the first media data within the first user workspace sub-window and movement of the selected first media data into the composite workspace sub-window;

receiving a second set of control data from a second mobile device-corresponding to a click-and-drag selection and move by the second user of at least part of the second media data within the second user workspace sub-window and movement of the second media data into the composite workspace sub-window; and rendering, within the composite workspace sub-window, the first selected media data that has been moved, and the second selected media data that has been moved.

6. The method of claim 5, wherein at least one of the first set of control data from the first mobile device and the second set of control data from the second mobile device includes control data to control icons in the UI window.

7. An electronic media node device, comprising:

processing logic, the processing logic used by the media server node device to:

perform collaborative media data editing by at least a first user and a second user and to render a user interface (UI) window on a display of a media server node with at least a first user workspace sub-window, a second user workspace sub-window, and a composite workspace sub-window, the sub-windows being rendered contemporaneously on the display;

receive first and second sets of streaming video media data from first and second computing devices, respectively;

render the first and second sets of media data within the first and second user workspace sub-windows, respectively; and receive first user input data from the first computing device corresponding to a click-and-drag selection and move by the first user of at least part of the first media data within the first user workspace sub-window and movement of the selected first media data into the composite workspace sub-window;

receive second user input data from the second computing device corresponding to a click-and-drag selection and move by the second user of at least part of the second media data within the second user workspace sub-window and movement of the selected second media data into the composite workspace sub-window;

render, using the first and second user input data, the selected at least part of the first and second media data, respectively, to form a third set of media data within the composite workspace sub-window.

8. The first electronic media node device of claim 7, wherein at least one of the first set of user input data from the first mobile device and second set of user input data from the second mobile device includes user intput data to control icons within the UI window.

9. The media node device of claim 7, wherein at least one of the first mobile device and second mobile device is physically connected to the media node.

10. The media node device of claim 7, wherein at least one of the first mobile device and second mobile device is wirelessly connected to the media node.

11. The media node device of claim 7, wherein:

the first mobile device is connected to a wireless access network;

the wireless access network is connected to a physical network comprising the second mobile device;

the media node is connected to the second mobile device; and the media server node is connected to the display.

* * * * *